United States Patent
Noishiki et al.

(10) Patent No.: US 8,673,243 B2
(45) Date of Patent: Mar. 18, 2014

(54) REACTOR AND MANUFACTURING METHOD OF REACTOR

(75) Inventors: Koji Noishiki, Takasago (JP); Yasutake Miwa, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 162 days.

(21) Appl. No.: 13/143,299

(22) PCT Filed: Dec. 22, 2009

(86) PCT No.: PCT/JP2009/071306
§ 371 (c)(1), (2), (4) Date: Jul. 5, 2011

(87) PCT Pub. No.: WO2010/082432
PCT Pub. Date: Jul. 22, 2010

(65) Prior Publication Data
US 2011/0268616 A1     Nov. 3, 2011

(30) Foreign Application Priority Data
Jan. 13, 2009 (JP) ................... 2009-004167

(51) Int. Cl.
*B01J 8/00* (2006.01)
*B01J 10/00* (2006.01)
*C03C 15/00* (2006.01)

(52) U.S. Cl.
USPC ........... 422/602; 422/603; 422/198; 422/129; 366/336; 366/340; 216/58; 216/63

(58) Field of Classification Search
USPC .......... 422/602, 603, 198, 129; 366/336, 340; 216/58, 63
See application file for complete search history.

(56) References Cited

U.S. PATENT DOCUMENTS

2006/0166375 A1* 7/2006 Hawkins et al. ............... 436/524
2007/0053808 A1   3/2007 Markowz et al.
(Continued)

FOREIGN PATENT DOCUMENTS

JP     2004 290971     10/2004
JP     2006 122735     5/2006
(Continued)

OTHER PUBLICATIONS

U.S. Appl. No. 13/143,092, filed Jun. 1, 2011, Noishiki, et al.
(Continued)

*Primary Examiner* — Lessanework Seifu
(74) *Attorney, Agent, or Firm* — Oblon, Spivak, McClelland, Maier & Neustadt, L.L.P.

(57) ABSTRACT

A reactor includes respective first and second introduction passages for introducing first and second reactants, a merging passage in which the first reactant merges with the second reactant, and a reaction passage in which the two merged reactants react with each other. First and second introduction grooves respectively constituting part of the first and second introduction passages are formed in a first surface of the base of the flow path structure of the reactor, while a reaction groove constituting part of the reaction passage is formed in a second surface of the base. A merging hole constituting part of the merging passage runs from the first surface of the base to the second surface thereof. The downstream end of the first introduction groove and the downstream end of the second introduction groove merge at the merging hole from different directions.

4 Claims, 12 Drawing Sheets

(56) References Cited

U.S. PATENT DOCUMENTS

| | | |
|---|---|---|
| 2010/0178213 A1 | 7/2010 | Ban et al. |
| 2010/0178221 A1 | 7/2010 | Yoshida et al. |
| 2010/0179230 A1 | 7/2010 | Ban et al. |

FOREIGN PATENT DOCUMENTS

| | | |
|---|---|---|
| JP | 2006 255634 | 9/2006 |
| JP | 2006 523522 | 10/2006 |
| JP | 2007 61685 | 3/2007 |
| JP | 2008 168173 | 7/2008 |

OTHER PUBLICATIONS

U.S. Appl. No. 13/296,810, filed Nov. 15, 2011, Noishiki, et al.
U.S. Appl. No. 13/363,635, filed Feb. 1, 2012, Noishiki, et al.
International Search Report issued Apr. 20, 2010 in PCT/JP09/71306 filed Dec. 22, 2009.
U.S. Appl. No. 13/818,884, filed Feb. 25, 2013, Noishiki, et al.

* cited by examiner

REACTOR AND MANUFACTURING METHOD OF REACTOR

TECHNICAL FIELD

The present invention relates to a reactor and a manufacturing method of the reactor.

BACKGROUND ART

Conventionally, by reacting a first reactant and a second reactant with each other while causing both the reactants to flow in a contact state, a desired reaction product is manufactured. In manufacture of such a product, for example, a reactor disclosed in the following Patent Document 1 is used.

FIG. 12 shows one example of the reactor disclosed in this Patent Document 1. The reactor shown in FIG. 12 is provided with a flow path structure 102 inside which a reactant flow passage for causing reactants to flow is provided. The reactant flow passage inside the flow path structure 102 is formed by a first introduction passage 104 through which a first reactant is introduced, a second introduction passage 106 through which a second reactant is introduced, a merging passage 108 for merging both the reactants respectively flowing through the introduction passages 104, 106, and a reaction passage 110 for reacting both the reactants merged in the merging passage 108 with each other while causing the reactants to flow.

The flow path structure 102 includes a base 112, and a pair of sealing plates 114, 116 integrated while sandwiching the base 112. A first introduction groove 118 constituting the first introduction passage 104 and a reaction groove 120 constituting the reaction passage 110 are formed linearly side by side on a first surface of the base 112. A second introduction groove 122 constituting the second introduction passage 106 is formed on a second surface of the base 112 so as to extend in parallel to the first introduction groove 118. A merging hole 124 constituting the merging passage 108 runs from the first surface of the base 112 to the second surface so as to connect the grooves 118, 122, 120 between downstream ends of both the introduction grooves 118, 122 and an upstream end of the reaction groove 120. By covering opening parts of these grooves 118, 122, 120 and the merging hole 124 with the corresponding sealing plates 114, 116, the first introduction passage 104, the second introduction passage 106, the merging passage 108, and the reaction passage 110 are formed. In this reactor, a bottom surface of the first introduction groove 118 and a bottom surface of the reaction groove 120 are formed to be flush with each other.

However, with the above conventional configuration, since the first introduction groove 118 and the reaction groove 120 are formed linearly side by side on the first surface of the base 112 and the bottom surfaces of both the first introduction groove 118 and the reaction groove 120 are formed to be flush with each other, the first reactant linearly and smoothly flows. On the other hand, since the second introduction groove 122 is formed on the second surface of the base 112 serving as an opposite surface to the surface on which the first introduction groove 118 and the reaction groove 120 are formed, the second reactant is merged with the linearly-flowing first reactant in the middle. Therefore, it is relatively difficult to sufficiently mix the second reactant and the first reactant. As a result, it is difficult to increase uniformity of the mixing of both the reactants.

CITED DOCUMENT LIST

Patent Document

Patent Document 1: Japanese Patent Laid-Open No. 2008-168173

SUMMARY OF THE INVENTION

An object of the present invention is to provide a reactor and a manufacturing method of a reactor in which the above problems are solved.

Another object of the present invention is to increase uniformity of mixing of reactants in the reactor.

The reactor according to one aspect of the present invention is a reactor for reacting a first reactant and a second reactant with each other while causing the reactants to flow, including a flow path structure having an internal reactant flow passage having a first introduction passage through which the first reactant is introduced, a second introduction passage through which the second reactant is introduced, a merging passage connected to the downstream side of the first introduction passage and the downstream side of the second introduction passage, the merging passage for merging the first reactant flowing through the first introduction passage and the second reactant flowing through the second introduction passage, and a reaction passage connected to the downstream side of the merging passage with each other, the reaction passage for reacting both the reactants merged in the merging passage with each other while causing the reactants to flow, wherein the flow path structure has a base, a first sealing member joined to a first surface of the base while covering the first surface, and a second sealing member joined to a second surface of the base while covering the second surface, a first introduction groove constituting the first introduction passage and a second introduction groove constituting the second introduction passage are formed on the first surface of the base, a reaction groove constituting the reaction passage is formed on the second surface of the base, a merging hole constituting the merging passage runs from the first surface of the base to the second surface, the merging hole serves as a common end point of the first introduction groove and the second introduction groove and a starting point of the reaction groove, and a downstream end of the first introduction groove and a downstream end of the second introduction groove are merged at the merging hole from different directions from each other on the first surface of the base.

MODES FOR CARRYING OUT THE INVENTION

Hereinafter, an embodiment of the present invention will be described with reference to the drawings.

Firstly, with reference to FIGS. 1 to 9, a configuration of a reactor according to one embodiment of the present invention will be described.

Figure 1:
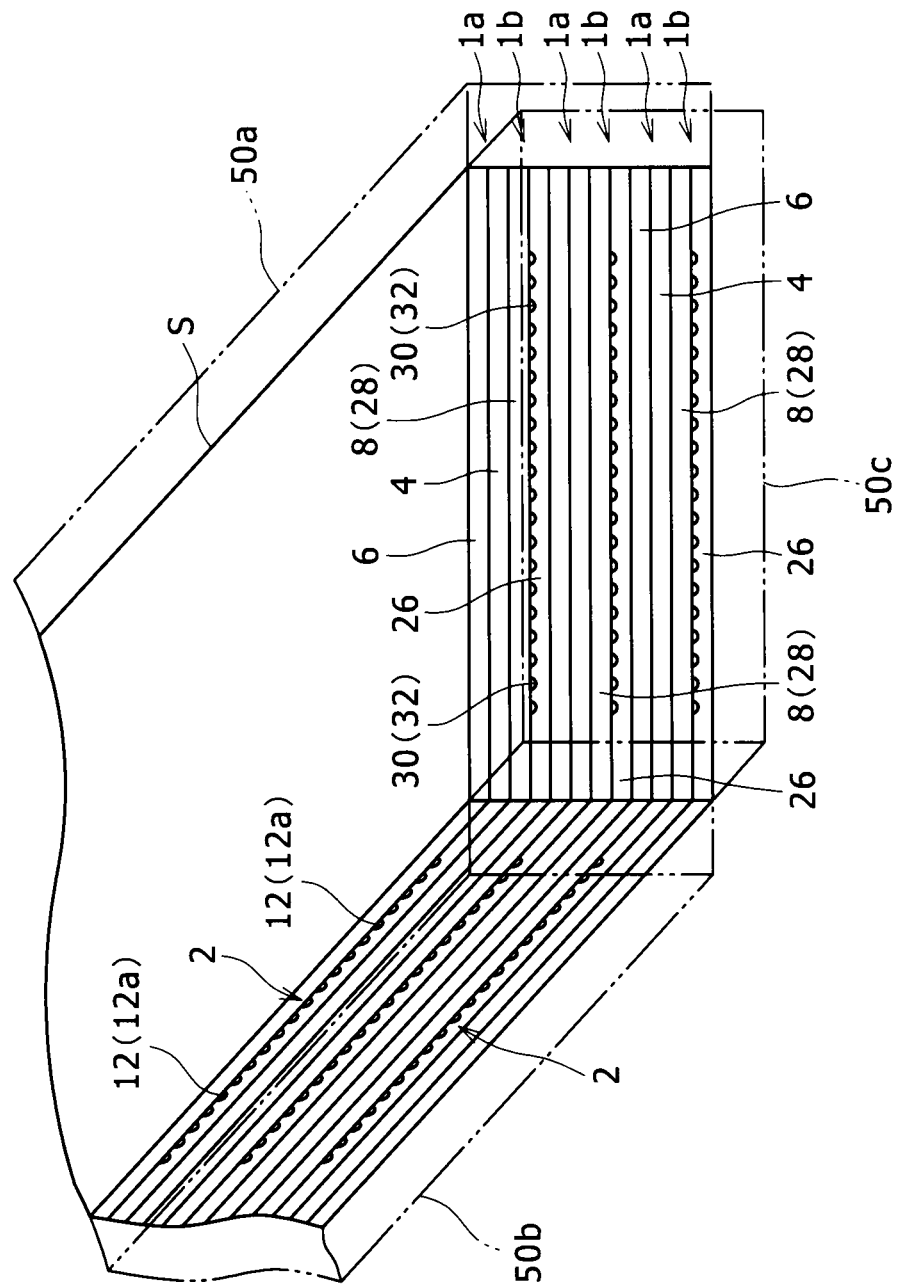
FIG. 1 A perspective view of a reactor according to one embodiment of the present invention.

The reactor according to the present embodiment is provided with a flow path device S as shown in FIG. 1. This flow path device S is provided with a plurality of first flow path structures 1a and a plurality of second flow path structures 1b. The first flow path structures 1a and the second flow path structures 1b are alternately laminated. Each of the first flow path structures 1a has a plurality of internal reactant flow passages 2 for causing reactants to flow, and each of the second flow path structures 1b has a plurality of internal heating medium flow passages 30 for causing a heating medium to flow. It should be noted that the first flow path structure 1a among these two kinds of flow path structures 1a, 1b is included in a concept of a flow path structure of the present invention.

The reactor according to the present embodiment is generally called as a micro reactor. This reactor is to manufacture a desired reaction product by reacting a first reactant and a second reactant with each other while causing the reactants to flow in the plurality of minute reactant flow passages 2 provided in the first flow path structure 1a.

Figure 2:
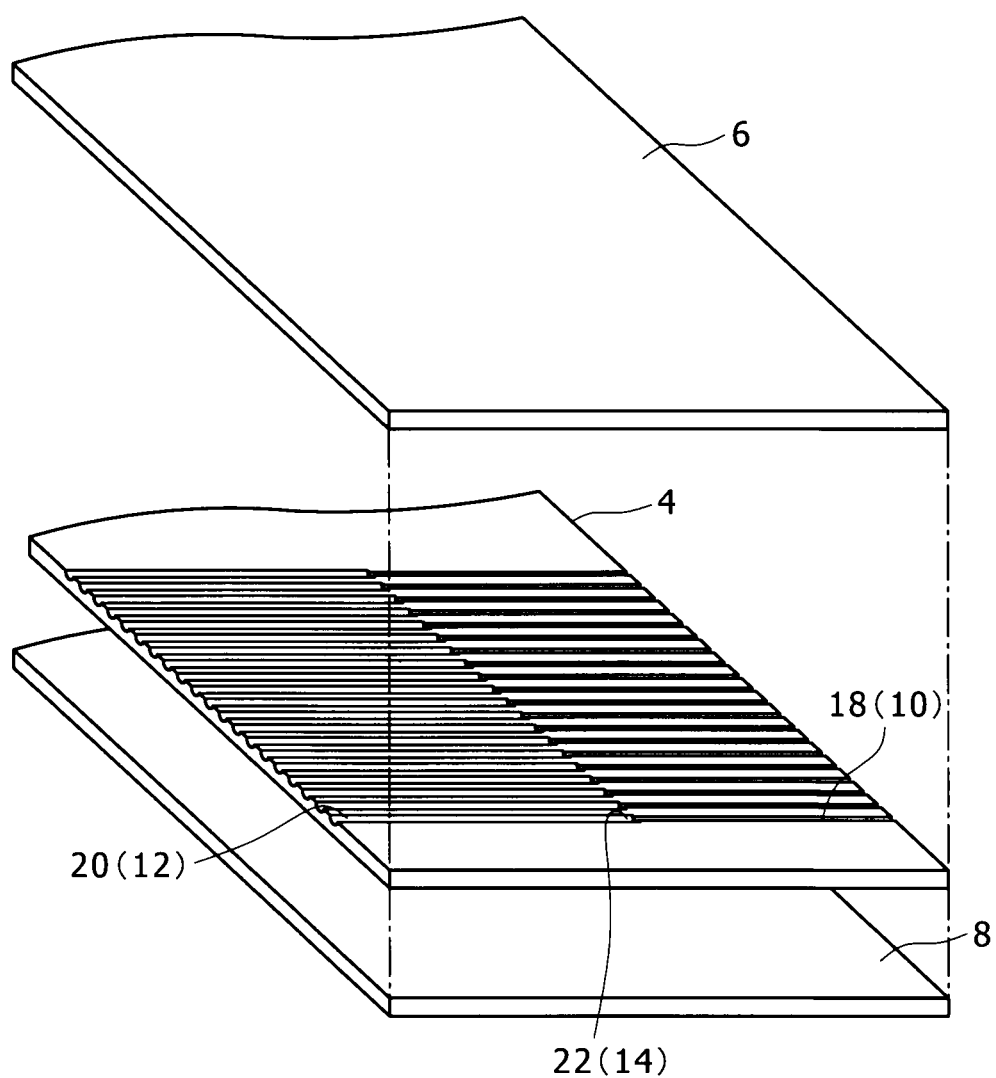
FIG. 2 An exploded perspective view of a first flow path structure constituting a flow path device of the reactor shown in FIG. 1.

Specifically, as shown in FIG. 2, each of the first flow path structures 1a has a base 4, a first sealing member 6, and a second sealing member 8. The base 4, the first sealing member 6, and the second sealing member 8 are respectively formed of a rectangular flat plate. The first sealing member 6 is joined to a first surface of the base 4 while covering the first surface, and the second sealing member 8 is joined to a second surface of the base 4 while covering the second surface. That is, by integrating these sealing members 6, 8 and the base 4 in a state that the base 4 is sandwiched between the first sealing member 6 and the second sealing member 8, the first flow path structure 1a is constituted.

Figure 6:
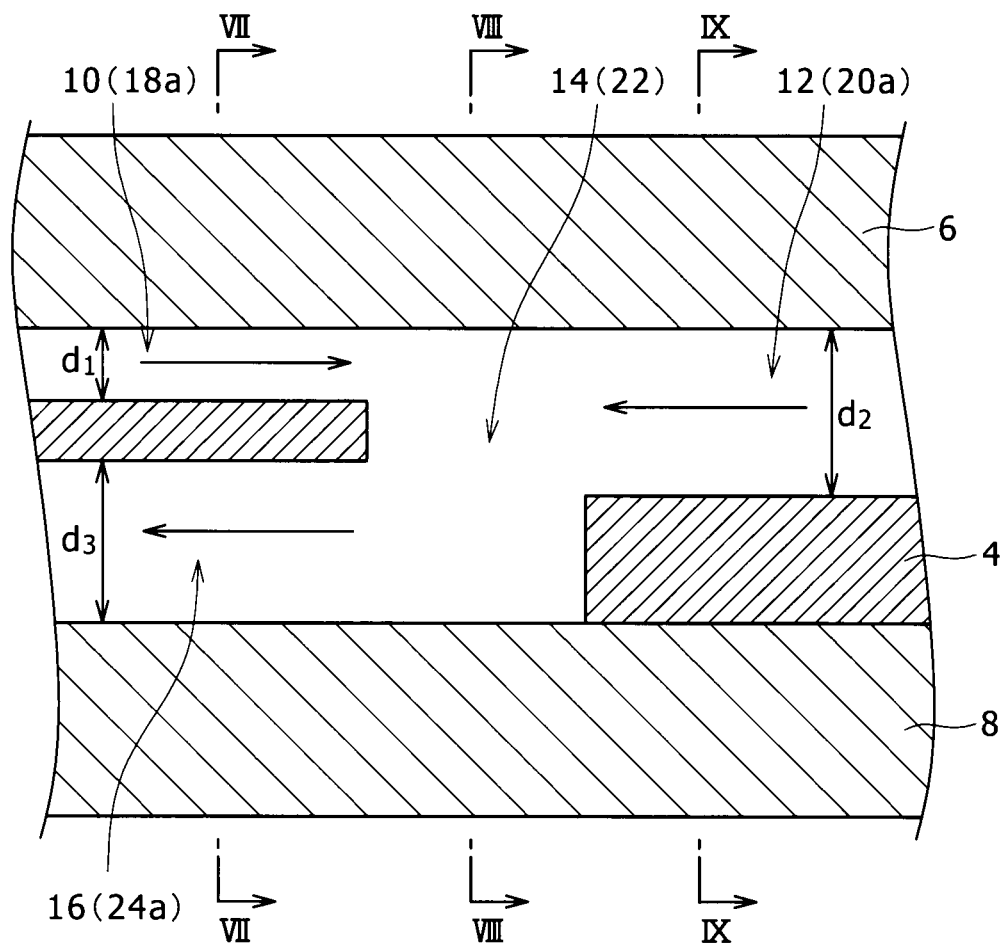
FIG. 6 A sectional view along the first introduction passage and the second introduction passage in the vicinity of the merging passage of the first flow path structure.

Each of the reactant flow passages 2 provided inside the first flow path structure 1a has a first introduction passage 10 through which the first reactant is introduced, a second introduction passage 12 through which the second reactant is introduced, a merging passage 14 connected to the downstream side of the first introduction passage 10 and the downstream side of the second introduction passage 12, the merging passage 14 for merging the first reactant flowing through the first introduction passage 10 and the second reactant flowing through the second introduction passage 12, and a reaction passage 16 connected to the downstream side of this merging passage 14 with each other, the reaction passage for reacting both the reactants merged in the merging passage 14 with each other while causing the reactants to flow (refer to FIG. 6).

Figure 3:
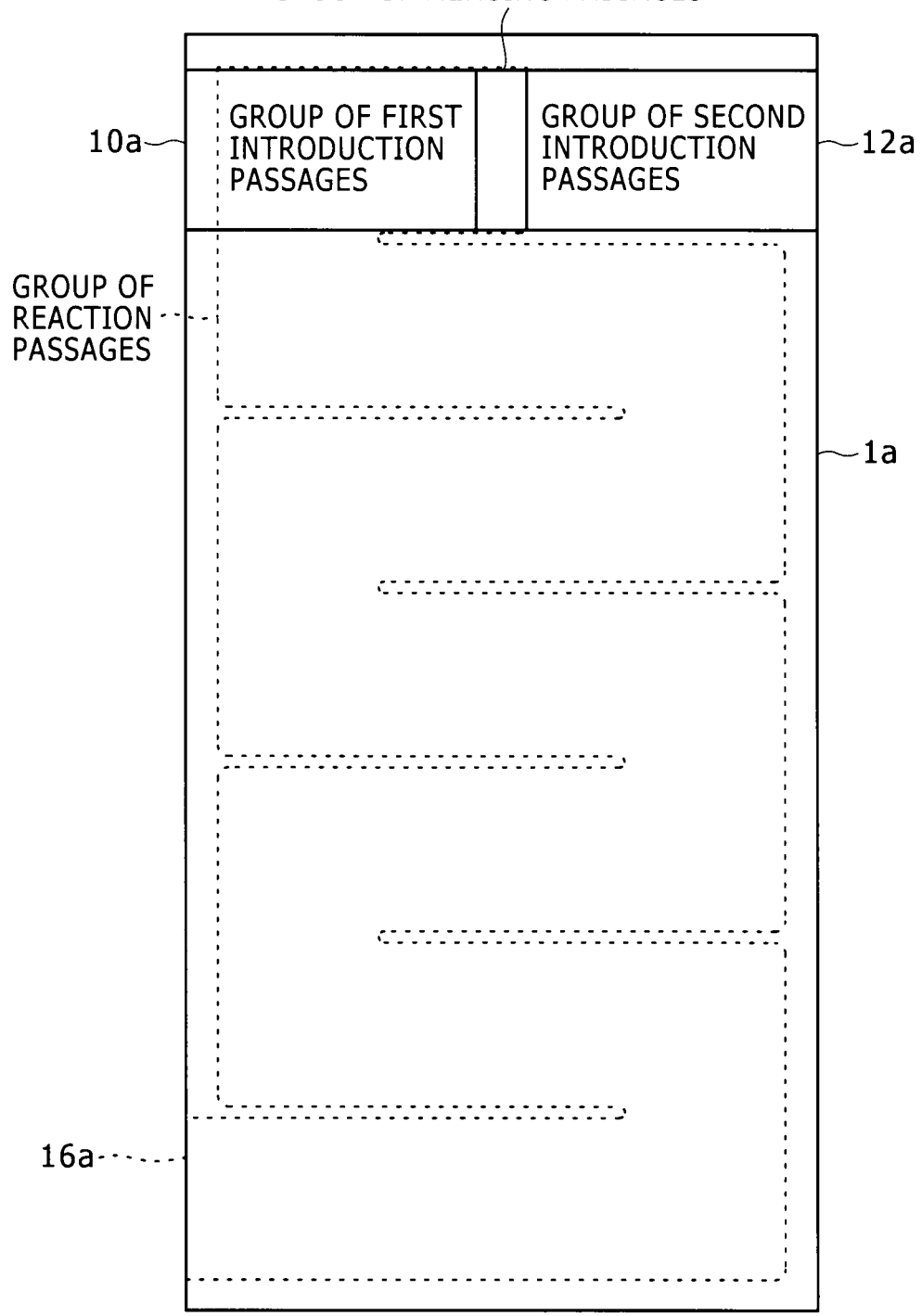
FIG. 3 A view schematically showing a positional relationship between a group of first introduction passages, a group of second introduction passages, a group of merging passages, and a group of reaction passages in the first flow path structure.
Figure 4:
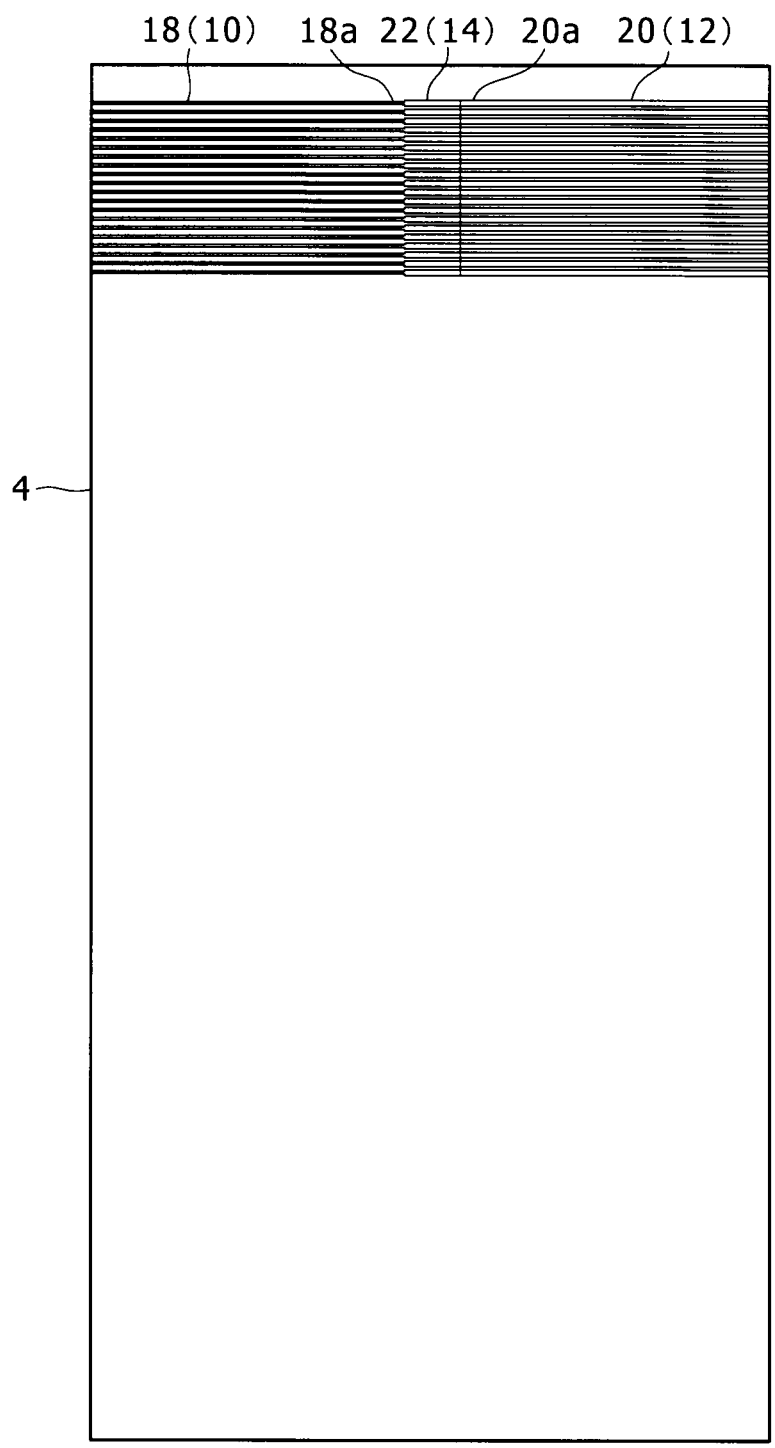
FIG. 4 A plan view of a first surface of a base constituting the first flow path structure.
Figure 5:
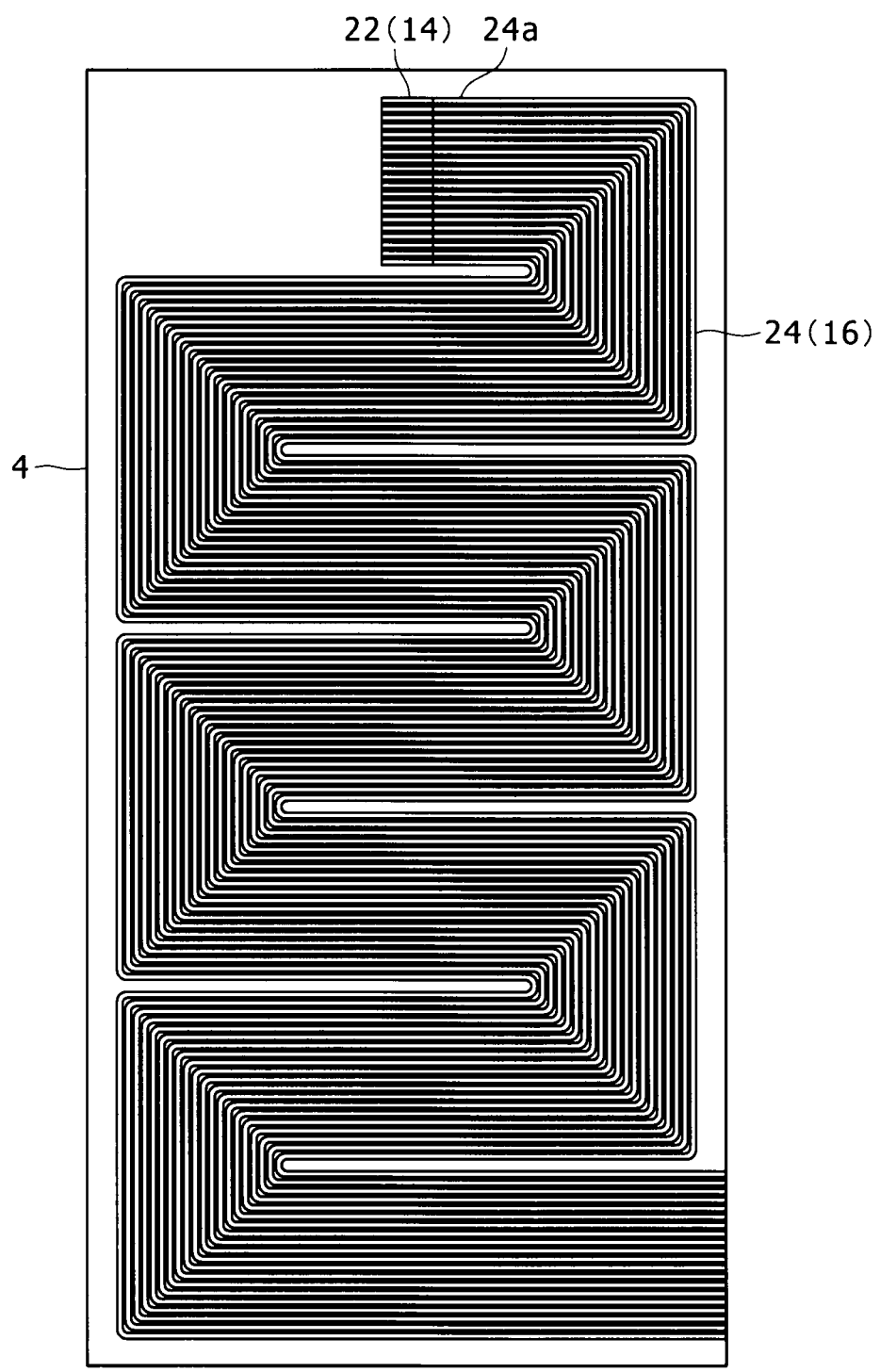
FIG. 5 A plan view of a second surface of the base constituting the first flow path structure.

In the first flow path structure 1a, a group of the first introduction passages 10 of the reactant flow passages 2, a group of the second introduction passages 12 of the reactant flow passages 2, a group of the merging passages 14 of the reactant flow passages 2, and a group of the reaction passages 16 of the reactant flow passages 2 are respectively arranged with a positional relationship as shown in FIG. 3.

The group of the first introduction passages 10 is arranged in the vicinity of one end in the longitudinal direction of the first flow path structure 1a, and provided on the side of the first surface of the base 4. Each of the first introduction passages 10 has an introduction port 10a on one end in the width direction of the first flow path structure 1a. The first introduction passages 10 extend linearly in the width direction from the introduction ports 10a toward center in the width direction of the first flow path structure 1a. The reactor of the present embodiment is provided with a first reactant supply portion 50a (refer to FIG. 1). This first reactant supply portion 50a is connected to the introduction ports 10a of the first introduction passages 10. Thereby, the first reactant is divided and introduced from the first reactant supply portion 50a into the first introduction passages 10.

Figure 7:
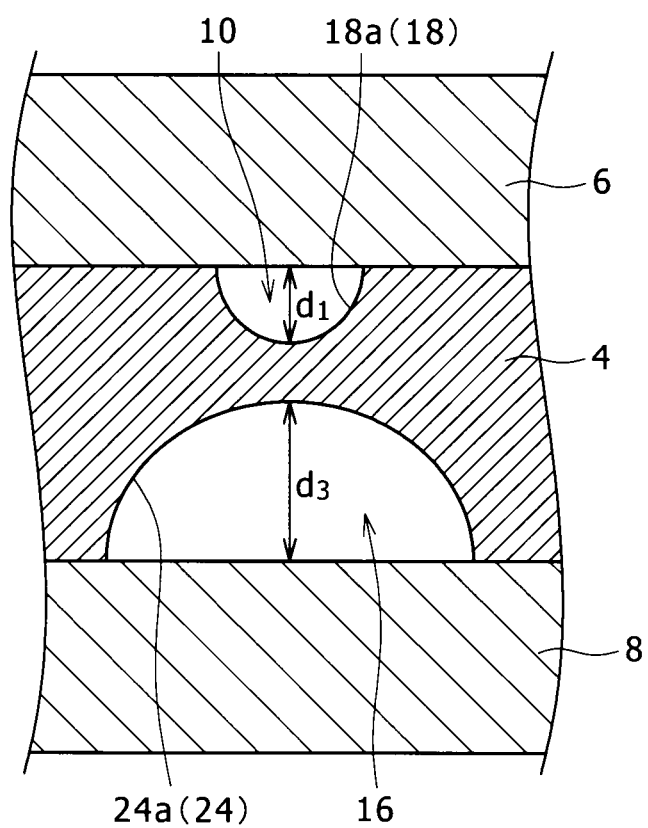
FIG. 7 A partially sectional view of the first flow path structure along the line VII-VII in FIG. 6.

The first introduction passages 10 are arranged at equal intervals in the longitudinal direction of the first flow path structure 1a, and also arranged in parallel to each other and in a row. As shown in FIG. 7, the first introduction passages 10 respectively have a semicircular shape of section orthogonal to the flowing direction of the first reactant (longitudinal direction of the first introduction passages 10). Each of the first introduction passages 10 has constant width and a constant equivalent diameter over the entire length thereof. The first introduction passages 10 respectively have equal path length and an equal equivalent diameter. Thereby, pressure losses of the first introduction passages 10 are equalized. Since the pressure losses of the first introduction passages 10 are equalized, a flow rate of the first reactant divided from the first reactant supply portion 50a into the first introduction passages 10 to flow is uniformized.

The group of the second introduction passages 12 is arranged in vicinity of the end of the first flow path structure 1a on the same side as the group of the first introduction passages 10, and provided on the side of the first surface of the base 4 which is the same as the group of the first introduction passages 10. Each of the second introduction passages 12 has an introduction port 12a on the other end in the width direction of the first flow path structure 1a, that is, on the end positioned on the opposite side of the introduction ports 10a of the first introduction passages 10. The second introduction passages 12 extend linearly in the width direction from the introduction ports 12a toward the center in the width direction of the first flow path structure 1a. The first introduction passages 10 and the second introduction passages 12 constituting the reactant flow passages 2 are positioned on identical straight lines. The reactor of the present embodiment is provided with a second reactant supply portion 50b (refer to FIG. 1). This second reactant supply portion 50b is connected to the introduction ports 12a of the second introduction passages 12. Thereby, the second reactant is divided and introduced from the second reactant supply portion 50b into the second introduction passages 12.

Figure 9:
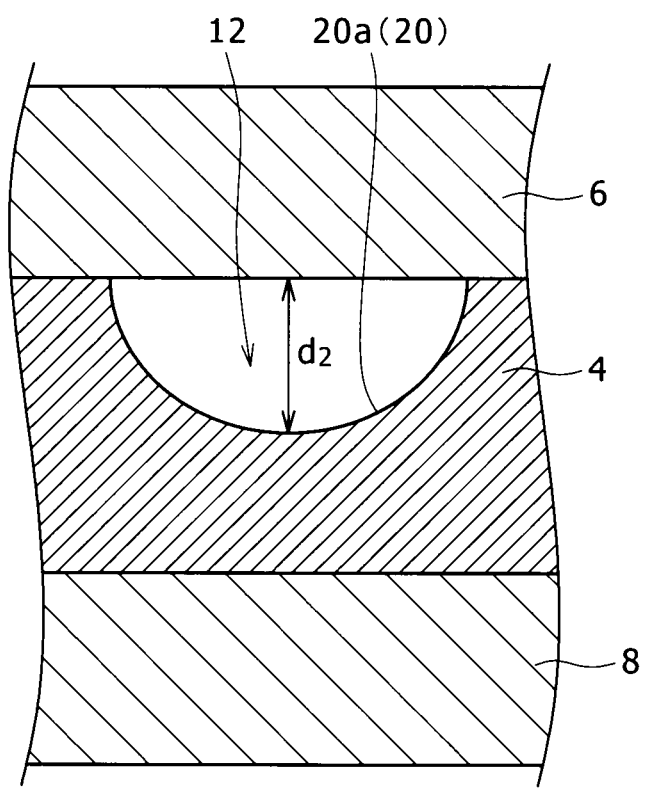
FIG. 9 A partially sectional view of the first flow path structure along the line IX-IX in FIG. 6.

The second introduction passages 12 are arranged at equal intervals in the longitudinal direction of the first flow path structure 1a, and also arranged in parallel to each other and in a row. As shown in FIG. 9, the second introduction passages 12 respectively have a semicircular shape of section orthogonal to the flowing direction of the second reactant (longitudinal direction of the second introduction passages 12). Each of the second introduction passages 12 has constant width and a constant equivalent diameter over the entire length thereof. This equivalent diameter of the second introduction passages 12 is larger than the equivalent diameter of the first introduction passages 10. The second introduction passages 12 respectively have equal path length and an equal equivalent diameter. Thereby, pressure losses of the second introduction passages 12 are equalized. Since the pressure losses of the second introduction passages 12 are equalized, a flow rate of the second reactant divided from the second reactant supply portion 50b into the second introduction passages 12 to flow is uniformized.

Figure 8:
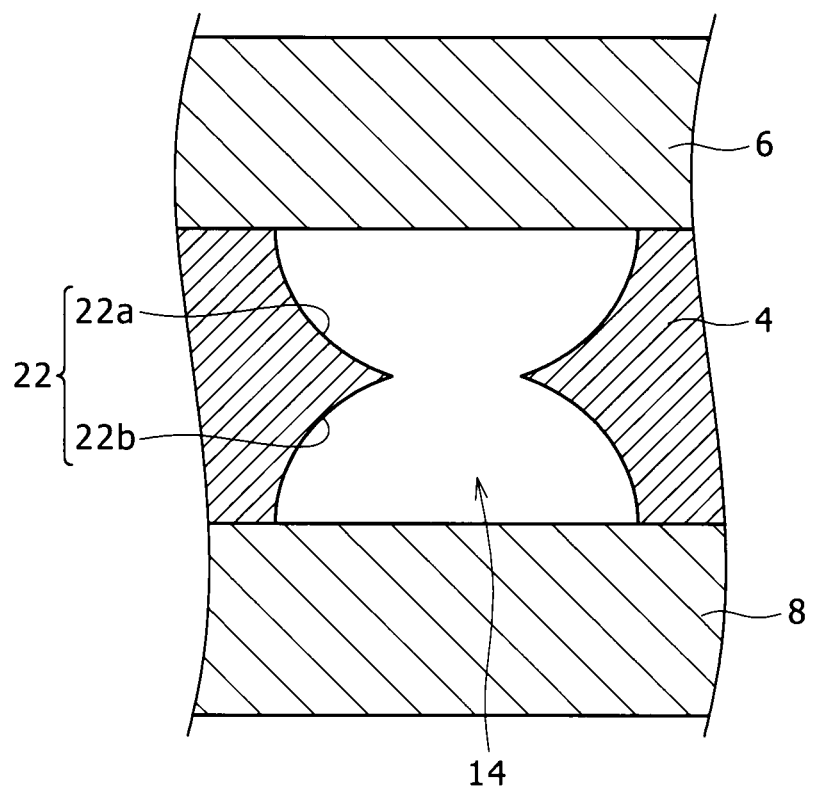
FIG. 8 A partially sectional view of the first flow path structure along the line VIII-VIII in FIG. 6.

The group of the merging passages 14 is arranged between the group of the first introduction passages 10 and the group of the second introduction passages 12. The merging passages 14 are connected to downstream ends of the corresponding first introduction passages 10 and downstream ends of the corresponding second introduction passages 12, and linearly extend in the same direction as both the introduction passages 10, 12. That is, the downstream ends of the corresponding first introduction passages 10 and the downstream ends of the corresponding second introduction passages 12 are merged in the merging passages 14 from the opposite sides to each other. Thereby, the first reactant flowing through the first introduction passages 10 and the second reactant flowing through the second introduction passages 12 flow into the merging passages 14 from the opposite sides to each other, and both the reactants are crashed into and mixed with each other. As shown in FIG. 8, the merging passages 14 respectively have a section orthogonal to the longitudinal direction thereof which is shaped such that two semicircles are combined with each other in the vicinity of vertexes of arcs thereof. The merging passages 14 respectively have an equivalent diameter larger than the equivalent diameter of the first introduction passages 10 and the equivalent diameter of the second introduction passages 12.

The group of the reaction passages 16 is provided on the side of the second surface of the base 4 in the first flow path structure 1a, that is, on the side of the opposite surface to the group of the first introduction passages 10 and the group of the second introduction passages 12. The reaction passages 16 take the corresponding merging passages 14 as starting points and linearly extend toward the one end in the width direction of the first flow path structure 1a in which the introduction ports 10a of the first introduction passages 10 are provided, then bend and linearly extend toward the other end in the width direction of the first flow path structure 1a, and after that, similarly and repeatedly bend and extend so as to go back and forth in the width direction of the first flow path structure 1a. Each of the reaction passages 16 has a discharge port 16a in the vicinity of the other end in the longitudinal direction of the first flow path structure 1a on the same side as the introduction ports 10a of the second introduction passages 10. The reaction passages 16 are arranged in a row, and path length of the reaction passages 16 is equal. As shown in FIG. 7, the reaction passages 16 respectively have a semicircular shape of section orthogonal to the flowing direction of the reactants. Each of the reaction passages 16 has constant width and a constant equivalent diameter over the entire length thereof. The reaction passages 16 respectively have equal path length and an equal equivalent diameter. Thereby, pressure losses of the reaction passages 16 are equalized. In the reaction passages 16, the first reactant and the second reactant merged in the merging passages 14 are reacted with each other while flowing, so that the reaction product is produced.

In the present embodiment, first introduction grooves 18 constituting the first introduction passages 10, second introduction grooves 20 constituting the second introduction passages 12, merging holes 22 constituting the merging passages 14, and reaction grooves 24 constituting the reaction passages 16 are respectively formed on the base 4. By simply covering opening parts of the grooves 18, 20, 24 and opening parts of the merging holes 22 with the sealing members 6, 8, the reactant flow passages 2 in the first flow path structure 1a are formed.

Specifically, the plurality of first introduction grooves 18 (refer to FIG. 4) is formed in parallel and in a row on the first surface of the base 4. By sealing the opening parts of the first introduction grooves 18 provided on the first surface of this base 4 with the first sealing member 6, the first introduction passages 10 are formed. Each of the first introduction grooves 18 has a downstream end 18a connected to each of the merging holes 22 described later. The downstream ends 18a have depth d1 (refer to FIG. 6). This depth d1 is included in a concept of first depth of the present invention. Each of the first introduction grooves 18 has uniform depth d1 over the entire length thereof. The first introduction grooves 18 respectively have a semicircular shape of section orthogonal to the flowing direction of the first reactant.

The plurality of second introduction grooves 20 (refer to FIG. 4) is formed in parallel and in a row on the first surface of the base 4. By sealing the opening parts of the second introduction grooves 20 provided on the first surface of this base 4 with the first sealing member 6, the second introduction passages 12 are formed. Each of the second introduction grooves 20 has a downstream end 20a connected to each of the merging holes 22 described later. The downstream ends 20a are positioned on identical straight lines to the downstream ends 18a of the corresponding first introduction grooves 18. The downstream ends 20a have depth d2 (refer to FIG. 6). This depth d2 is included in a concept of second depth of the present invention. The depth d2 is larger than the depth d1 of the first introduction grooves 18 and equal to depth d3 of the reaction grooves 24 described later. This depth d2 and the depth d3 described later are set so that the sum of the depth d2 and the depth d3 is larger than thickness of the base 4. It should be noted that each of the second introduction grooves 20 has uniform depth d2 over the entire length thereof. The second introduction grooves 20 respectively have a semicircular shape of section orthogonal to the flowing direction of the second reactant.

The merging passages 14 are formed by sealing both the opening parts of the merging holes 22 provided on the base 4. The plurality of merging holes 22 is formed in a row on the base 4. The merging holes 22 run from the first surface of the base 4 to the second surface between parts of the first introduction grooves 18 and parts of the second introduction grooves 20 corresponding to each other. The merging holes 22 serve as common end points of the first introduction grooves 18 and the second introduction grooves 20 and starting points of the reaction grooves 24 described later. The downstream ends 18a of the first introduction grooves 18 and the downstream ends 20a of the second introduction grooves 20 are merged at the merging holes 22 from the opposite sides from each other. By sealing the opening parts of the merging holes 22 provided on the first surface of the base 4 with the first sealing member 6 and by sealing the opening parts of the merging holes 22 provided on the second surface of the base 4 with the second sealing member 8, the merging passages 14 are formed. In correspondence with the sectional shape of the merging passages 14, the merging holes 22 respectively have a section orthogonal to the longitudinal direction thereof which is shaped such that two semicircles are combined with each other in the vicinity of vertexes of arcs thereof.

The plurality of reaction grooves 24 (refer to FIG. 5) is formed in parallel and in a row on the second surface of the base 4. By sealing the opening parts of the reaction grooves 24 provided on the second surface of this base 4 with the second sealing member 8, the reaction passages 16 are formed. Each of the reaction grooves 24 has an upstream end 24a connected to each of the merging holes 22. The upstream ends 24a have depth $d3$ (refer to FIG. 6). This depth $d3$ is included in a concept of third depth of the present invention. This depth $d3$ is set to be larger than a difference between the thickness of the base 4 and the depth $d2$ of the second introduction grooves 20 and smaller than a difference between the thickness of the base 4 and the depth $d1$ of the first introduction grooves 18. It should be noted that each of the reaction grooves 24 has uniform depth $d3$ over the entire length thereof. The reaction grooves 24 respectively have a semicircular shape of section orthogonal to the longitudinal direction thereof.

Each of the second flow path structures 1b has the plurality of internal heating medium flow passages 30 for causing the heating medium to flow as described above. The plurality of heating medium flow passages 30 is arranged in a row inside the second flow path structure 1b. Each of the heating medium flow passages 30 has an introduction port on an end surface in the longitudinal direction close to the side where the group of the first introduction passages 10 and the group of the second introduction passages 12 are arranged in the flow path device S. The heating medium flow passages 30 extend from the introduction ports in the longitudinal direction of the second flow path structure 1b, and are arranged at positions corresponding to the reaction passages 16.

This second flow path structure 1b is constituted by a heating medium flow passage base 26 and a sealing member 28. The heating medium flow passage base 26 and the sealing member 28 are rectangular flat plates in the same shape as the base 4, the first sealing member 6, and the second sealing member 8 constituting the first flow path structure 1a. The sealing member 28 also serves as the second sealing member 8. The sealing member 28 is joined to a surface of the heating medium flow passage base 26 while covering the surface. The heating medium flow passages 30 are formed by sealing opening parts of groove portions 32 formed on the surface of the heating medium flow passage base 26 with the sealing member 28.

A heating medium supply portion 50c (refer to FIG. 1) is connected to the introduction ports of the heating medium flow passages 30. The heating medium is divided and introduced from this heating medium supply portion 50c into the heating medium flow passages 30. Thereby, heat is exchanged between the heating medium flowing through the heating medium flow passages 30, and the first reactant and the second reactant flowing through the reaction passages 16 of the first flow path structure 1a, so that reaction of the first reactant and the second reactant in the reaction passages 16 is facilitated.

Next, a manufacturing method of the reactor of the present embodiment will be described.

In the manufacturing method of the reactor of the present embodiment, the first flow path structure 1a is formed so that the plurality of reactant flow passages 2 is provided inside the first flow path structure 1a, and each of the reactant flow passages 2 includes the first introduction passage 10, the second introduction passage 12, the merging passage 14, and the reaction passage 16.

Specifically, the plurality of first introduction grooves 18, the plurality of second introduction grooves 20, and parts 22a of the plurality of merging holes 22 having predetermined depth from the first surface of the base 4 (refer to FIG. 8) are respectively formed on the first surface of the base 4 by photo-etching, and the plurality of reaction grooves 24 and parts 22b of the plurality of the merging holes 22 having predetermined depth from the second surface of the base 4 (refer to FIG. 8) are respectively formed on the second surface of the base 4 by the photo-etching.

At this time, both the surfaces of the base 4 are firstly cleaned and cleansed, and after that, a photoresist is respectively applied onto both the surfaces of the base 4. On the first surface of the base 4, an area other than formation areas of the first introduction grooves 18, the second introduction grooves 20, and the merging holes 22 is exposed to light through a photomask. On the second surface of the base 4, an area other than formation areas of the reaction grooves 24 and the merging holes 22 is exposed to light through another photomask. After that, the unexposed photoresist is removed from both the surfaces of the base 4, and the formation areas of the first introduction grooves 18, the second introduction grooves 20, the reaction grooves 24, and the merging holes 22 are exposed.

Next, only the formation area of the first introduction grooves 18 on the first surface of the base 4 is covered by a coating material such as a masking tape, and after that, an etchant is blown onto both the surfaces of the base 4, and both the surfaces are etched at the same time. At this time, the formation area of the first introduction grooves 18 covered by the coating material is not etched, and only the exposed formation areas of the second introduction grooves 20, the reaction grooves 24, and the merging holes 22 are etched. The formation area of the second introduction grooves 20 and the formation area of the merging holes 22 are etched up to depth corresponding to a difference between the depth $d2$ (=the depth $d3$) and the depth $d1$ from the first surface of the base 4, and the formation area of the reaction grooves 24 and the formation area of the merging holes 22 are etched up to the same depth from the second surface of the base 4. Then, etching is temporarily stopped.

After this, the coating material is removed and the formation area of the first introduction grooves 18 is exposed. After that, the etching is resumed. In this resumed etching step, the formation area of the first introduction grooves 18, the formation area of the second introduction grooves 20, and the formation area of the merging holes 22 are etched by the depth $d1$ from the side of the first surface of the base 4, and at the same time, the formation area of the reaction grooves 24 and the formation area of the merging holes 22 are etched by the same depth from the side of the second surface of the base 4. Thereby, the first introduction grooves 18 having the depth $d1$ from the first surface of the base 4 are formed. The formation area of the second introduction grooves 20 and the formation area of the reaction grooves 24 are respectively etched up to the depth of "$(d2-d1)+d1=d2$". Thereby, the second introduction grooves 20 having the depth $d2$ from the first surface of the base 4 and the reaction grooves 24 having the depth $d2=d3$ from the second surface of the base 4 are formed. The formation area of the merging holes 22 is etched up to the same depth $d2$ as the second introduction grooves 20 from the side of the first surface of the base 4, and also etched up to the same depth $d3$ as the reaction grooves 24 from the side of the second surface of the base 4. Thereby, the parts 22a etched up to the depth d2 from the first surface of the base 4 and the parts 22b etched up to the depth d3 from the second surface of the base 4 are connected to each other, so that the merging holes 22 run through. That is, the merging holes 22 are formed by utilizing the etching for forming the second introduction grooves 20 and the etching for forming the reaction grooves 24. After this, the base 4 is cleansed and the resist film is removed.

In another step, the plurality of groove portions 32 is formed on the heating medium flow passage base 26 constituting the second flow path structure 1b. Specifically, the plurality of groove portions 32 is formed on a first surface of the heating medium flow passage base 26 by the same photoetching as the above step.

Finally, the base 4 and the heating medium flow passage base 26 which are etched as above, the first sealing member 6, and the second sealing member 8 (sealing member 28) are laminated as in FIG. 1, and integrated by diffusion bonding, so that the flow path device S is manufactured.

Other constituent members such as the first reactant supply portion 50a, the second reactant supply portion 50b, and the heating medium supply portion 50c are attached to the flow path device S manufactured in such a way, so that the reactor according to the present embodiment is manufactured.

Next, a reacting method in which the reactor according to the present embodiment is used will be described.

In this reacting method, firstly, the first reactant is introduced from the first reactant supply portion 50a into the first introduction passages 10 of the reactant flow passages 2, and the second reactant is introduced from the second reactant supply portion 50b into the second introduction passages 12 of the reactant flow passages 2. Since the pressure losses of the first introduction passages 10 are equalized, the first reactant is divided and flows into the first introduction passages 10 at a uniform flow rate. Since the pressure losses of the second introduction passages 12 are equalized, the second reactant is divided and flows into the second introduction passages 12 at a uniform flow rate.

The first reactant passing through the first introduction passages 10 and the second reactant passing through the second introduction passages 12 flow into the merging passages 14 from the opposite sides to each other, and are merged in the merging passages 14 so as to be crashed into each other. Thereby, both the reactants are uniformly mixed. Both the reactants run through to the side of the second surface of the base 4 and flow into the reaction passages 16. After that, both the reactants are reacted with each other while flowing to the downstream side in the reaction passages 16, and thereby a predetermined reaction product is produced.

As described above, in the present embodiment, the first introduction grooves 18 and the second introduction grooves 20 are formed on the same surface of the base 4 constituting the first flow path structure 1a. The downstream ends 18a of the first introduction grooves 18 and the downstream ends 20a of the second introduction grooves 20 are merged at the merging holes 22 from the opposite sides to each other on the above surface, and the reaction grooves 24 are formed on the second surface of the base 4 taking the merging holes 22 as the starting points. Therefore, in the present embodiment, the first reactant and the second reactant can be mixed with high uniformity in comparison to a conventional configuration in which first introduction grooves and reaction grooves are formed on a first surface of a base so that bottom surfaces are flush with each other, and second introduction grooves formed on a second surface of the base are merged with the above grooves through merging holes. That is, in the present embodiment, since the downstream ends of the first introduction grooves 18 and the second introduction grooves 20 formed on the first surface of the base 4 are merged at the merging holes 22 from the opposite sides to each other, and the reaction grooves 24 extend on the second surface of the base 4 taking the merging holes 22 as the starting points, the first reactant and the second reactant run through to the side of the second surface of the base 4 and flow into the reaction passages 16 while being merged so as to be crashed into each other. Thus, both the reactants are mixed with each other under substantially equal conditions. Therefore, in the present embodiment, in comparison to a conventional mixing mode in which a second reactant is mixed from the second reactant grooves formed on the second surface of the base into a first reactant linearly and smoothly flowing in the first introduction grooves and the reaction grooves formed on the first surface of the base so that the bottom surfaces are flush with each other, both the reactants are easily mixed with each other. As a result, the uniformity of mixing of both the reactants can be increased.

In the present embodiment, the plurality of first introduction grooves 18 is formed in parallel and in a row and the plurality of second introduction grooves 20 is formed in parallel and in a row on the first surface of the base 4, and further, the plurality of reaction grooves 24 is formed in parallel and in a row on the second surface of the base 4. Thus, a favorable integration result of the reactant flow passages 2 can be obtained. For example, in a case where the first introduction grooves and the second introduction grooves are merged on the first surface of the base so as to cross at an angle of less than 180°, a necessary area is increased. As a result, even when the reactant flow passages are to be integrated, a great integration result can be hardly obtained. Meanwhile, in the present embodiment, the first introduction passages 10 of a large number of the reactant flow passages 2 are provided in parallel and in a row and the second introduction passages 12 of a large number of the reactant flow passages 2 are provided in parallel and in a row on the side of the first surface of the base 4, and further, the reaction passages 16 of a large number of the reactant flow passages 2 are provided in parallel and in a row on the side of the second surface of the base 4. Thus, the first introduction passages 10 can be more integrally arranged and the second introduction passages 12 can be more integrally arranged on the side of the first surface of the base 4, and further, the reaction passages 16 can be more integrally arranged on the side of the second surface of the base 4. As a result, the reactant flow passages 2 can be favorably integrated in the reactor. Therefore, in the present embodiment, while increasing the uniformity of the mixing of the reactants, the favorable integration result of the reactant flow passages 2 can be obtained.

In the present embodiment, by etching the formation area of the merging holes 22 on the first surface of the base 4 up to the depth d2 at the same time as formation of the second introduction grooves 20, and also etching the formation area of the merging holes 22 on the second surface of the base 4 up to the depth d3 at the same time as formation of the reaction grooves 24, the parts 22a etched up to the depth d2 from the first surface of the base 4 and the parts 22b etched up to the depth d3 from the second surface of the base 4 are connected to each other, so that the merging holes 22 run through. Therefore, the merging holes 22 can be formed by utilizing the etching for forming the second introduction grooves 20 and the etching for forming the reaction grooves 24. That is, in the present embodiment, an exclusive etching step for forming the merging holes 22, a step for forming the merging holes 22 by laser processing or the like, and the like are not necessarily separately performed. Thus, a manufacturing step of the reactor can be simplified.

It should be noted that the embodiment disclosed herein is not limitation but only an example in all respects. The scope of this invention is defined not by description of the embodiment set forth above but by the appended claims, and intended to include all changes falling within the scope of the claims either literally or under the doctrine of equivalents.

Figure 10:
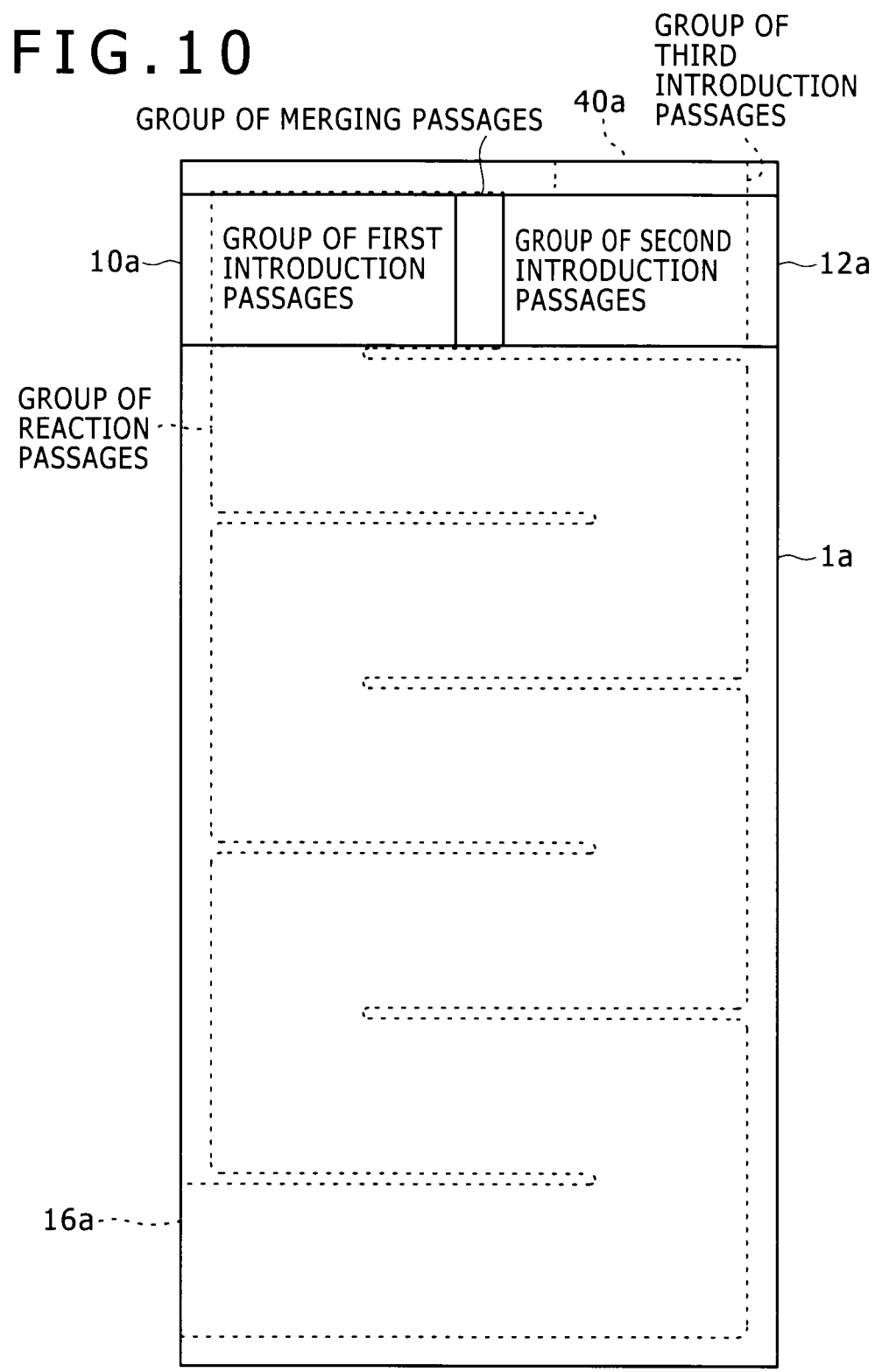
FIG. 10 A view schematically showing a positional relationship between the group of the first introduction passages, the group of the second introduction passages, a group of third introduction passages, the group of the merging passages, and the group of the reaction passages in the first flow path structure according to a modified example of the embodiment of the present invention.
Figure 11:
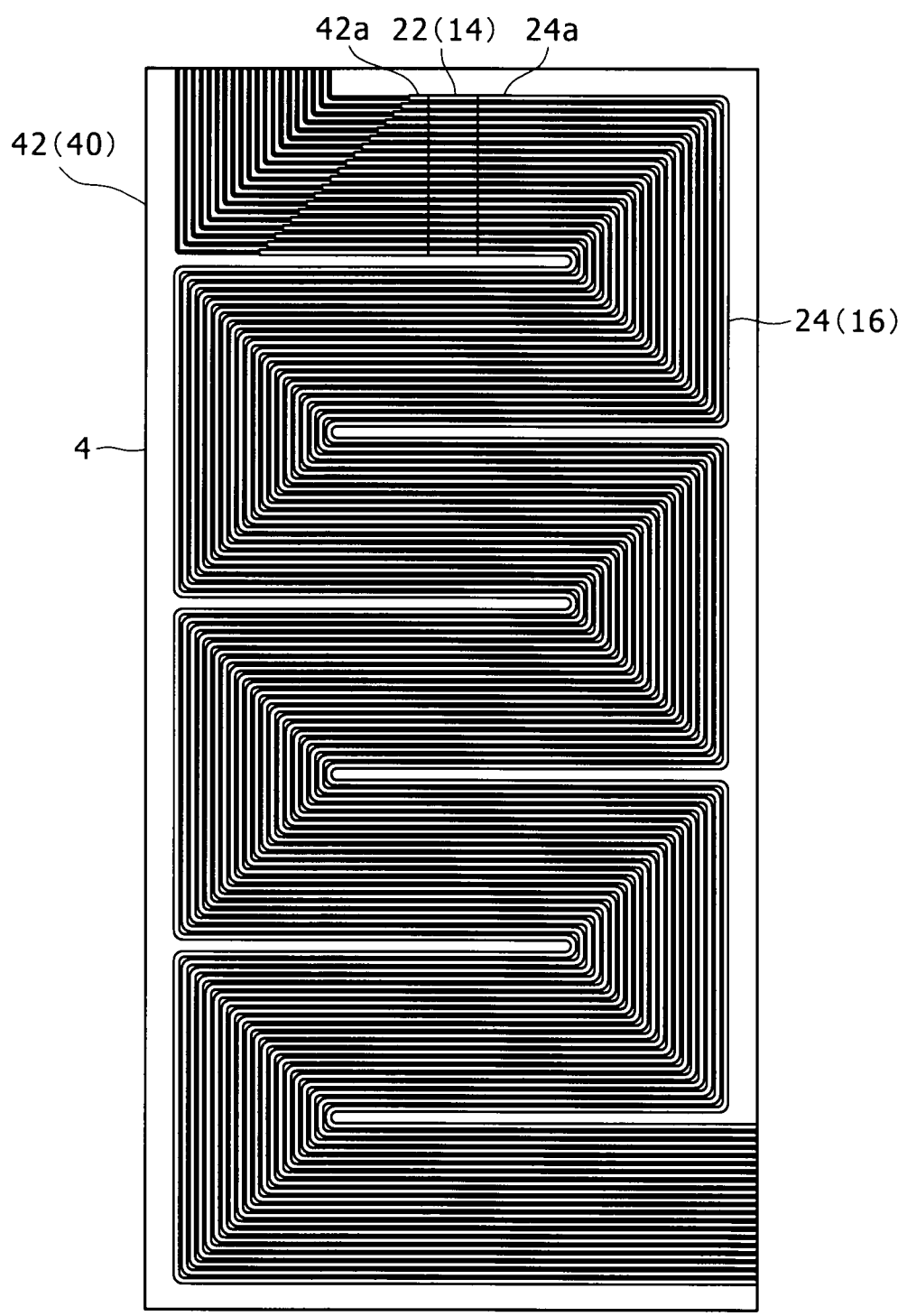
FIG. 11 A plan view of the second surface of the base constituting the first flow path structure according to the modified example shown in FIG. 10.
Figure 12:
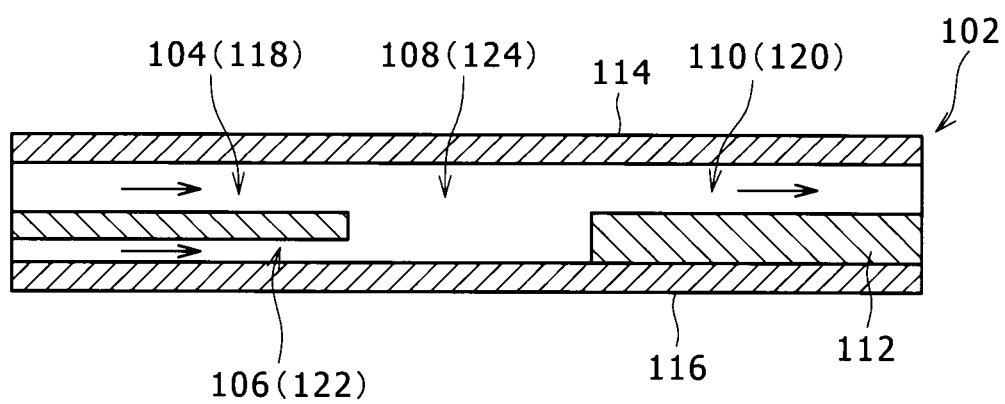
FIG. 12 A sectional view along flow passages of a flow path structure of a reactor according to one conventional example.

For example, as in a modified example of the above embodiment shown in FIGS. 10 and 11, a plurality of third introduction passages 40 may be further provided in the first flow path structure 1a with the above configuration.

Specifically, in this modified example, each of the reactant flow passages 2 has the third introduction passage 40 through which a third reactant is introduced, in addition to the first introduction passage 10, the second introduction passage 12, the merging passage 14, and the reaction passage 16. A group of the third introduction passages 40 of the reactant flow passages 2 is provided on the side of the second surface of the base 4 in the first flow path structure 1a, that is, on the side of the same surface as the group of the reaction passages 16. The group of the third introduction passages 40 is arranged in the vicinity of the end of the first flow path structure 1a on the same side as the group of the first introduction passages 10 and the group of the second introduction passages 12. Each of the third introduction passages 40 has an introduction port 40a on the one end in the longitudinal direction of the first flow path structure 1a. The third introduction passages 40 linearly extend from the introduction ports 40a in the longitudinal direction of the first flow path structure 1a, then bend by 90° and linearly extend in the width direction of the first flow path structure 1a, and are connected to the corresponding merging passages 14. A third reactant supply portion (not shown) is connected to the introduction ports 40a of the third introduction passages 40. The third reactant is divided and introduced from the third reactant supply portion into the third introduction passages 40.

The third introduction passages 40 respectively have different path length. Specifically, the third introduction passages 40 are arranged at equal intervals and also arranged in parallel and in a row. The more outer the third introduction passage 40 is arranged at the point where the third introduction passages 40 are bent, the greater path length of the third introduction passage 40 is. In the third introduction passages 40, by appropriately setting equivalent diameters of parts in accordance with the path length, the entire pressure losses of the third introduction passages 40 are set to be equal values.

That is, downstream ends of the third introduction passages 40 respectively have a semicircular shape of section orthogonal to the flowing direction of the third reactant as well as the second introduction passages 12 shown in FIG. 9, and the third introduction passages respectively include parts having different equivalent diameters due to a change in size of width thereof. The greater the path length of the third introduction passages 40 is, the larger the pressure losses are in comparison to the third introduction passages 40 having the smaller path length. However, by appropriately setting the equivalent diameters of the parts of the third introduction passages 40, a difference of the pressure losses due to a difference of the path length is eliminated, so that the pressure losses of the third introduction passages 40 are equalized. Specifically, the pressure losses are increased in the parts of the third introduction passages 40 having the smaller equivalent diameter, whereas the pressure losses are decreased in the parts having the larger equivalent diameter. Thus, by increasing the parts having the larger equivalent diameter, that is, the parts having the larger width and by decreasing the parts having the smaller equivalent diameter, that is, the parts having the smaller width in the third introduction passages 40 having the greater path length, the entire pressure losses of the third introduction passages 40 are equalized. Since the pressure losses of the third introduction passages 40 are equalized, a flow rate of the third reactant divided from the third reactant supply portion into the third introduction passages 40 to flow is uniformized.

A plurality of third introduction grooves 42 (refer to FIG. 11) is formed in parallel and in a row on the second surface of the base 4, that is, on the same surface as the surface on which the reaction grooves 24 are formed. By sealing opening parts of the third introduction grooves 42 provided on the second surface of this base 4 with the second sealing member 8, the third introduction passages 40 are formed. Each of the third introduction grooves 42 has uniform depth over the entire length thereof. Each of the third introduction grooves 42 has a downstream end 42a connected to each of the merging holes 22. The downstream ends 42a are merged at the corresponding merging holes 22 from the opposite side to the upstream ends 24a of the reaction grooves 24. The downstream ends 42a respectively have a semicircular shape of section orthogonal to the flowing direction of the third reactant. Parts of the third introduction grooves 42 corresponding to the parts of the third introduction passages 40 having the different equivalent diameters are formed to have constant depth and changed width.

With the configuration of this modified example, the third reactant is further mixed in addition to the first reactant and the second reactant, so that the reaction product can be produced. In a case where the first introduction grooves 18 are formed in parallel and in a row and the second introduction grooves 20 are formed in parallel and in a row on the first surface of the base 4 as in the above configuration, it is difficult to merge the third introduction grooves from the same direction at the merging holes 22 at which the introduction grooves 18, 20 are merged while avoiding interference with the introduction grooves 18, 20 on the first surface of this base 4. However, with the configuration of this modified example, the third introduction grooves 42 are formed on the second surface of the base 4. Thus, the third introduction grooves 42 can be arranged in parallel and in a row, and also easily merged at the merging holes 22 from the same direction. Due to this, in the present modified example, the third reactant can be merged with the first reactant and the second reactant from the same direction in the reactant flow passages 2. As a result, a merging mode of the third reactant with the first reactant and the second reactant in the reactant flow passages 2 can be uniformized.

Shapes and/or arrangement of the first introduction grooves 18 and the second introduction grooves 20 on the first surface of the base 4 are not limited to the shapes and/or the arrangement shown in the above embodiment.

For example, the first introduction grooves 18 and the second introduction grooves 20 are not necessarily arranged on the identical straight lines but may be merged at the merging holes 22 from different oblique directions from each other. The downstream ends 18a of the first introduction grooves 18 and the downstream ends 20a of the second introduction grooves 20 are only required to be merged at the merging holes 22 from the opposite sides to each other or from different directions from each other. Thus, parts other than the downstream ends 18a of the first introduction grooves 18 and parts other than the downstream ends 20a of the second introduction grooves 20 may respectively extend in any directions.

The merging passages 14 (merging holes 22) and the reaction passages 16 (reaction grooves 24) may be provided with shapes and/or arrangement other than the shapes and/or the arrangement of the above embodiment.

The first introduction passages 10 (first introduction grooves 18) may respectively extend in different directions, and the second introduction passages 12 (second introduction grooves 20) may respectively extend in different directions. The reaction passages 16 (reaction grooves 24) may respectively extend in different directions.

The reactor is not necessarily provided with the plurality of first flow path structures 1a and the plurality of second flow path structures 1b laminated as above but may be provided only with the single first flow path structure 1a.

Only the single reactant flow passage 2 may be provided inside the first flow path structure 1a.

Parts of the first introduction grooves 18, the second introduction grooves 20, the third introduction grooves 42, and the reaction grooves 24, having a semicircular shape of section may have a sectional shape in which a straight part parallel to the base 4 is provided on a bottom surface and arc parts are respectively connected to the both sides of the straight part.

In the above embodiment, a case where the depth d2 of the second introduction grooves 20 and the depth d3 of the reaction grooves 24 are equal is described as an example. However, when the sum of the depth d2 of the second introduction grooves 20 and the depth d3 of the reaction grooves 24 is larger than the thickness of the base 4, the depth d2 and the depth d3 may be different from each other.

For example, in a case where the depth d2 is larger than the depth d3, the first introduction grooves 18, the second introduction grooves 20, the reaction grooves 24, and the merging holes 22 are formed on the base 4 by the following etching step.

That is, as well as the above embodiment, the areas on both the surfaces of the base 4 other than the formation areas of the first introduction grooves 18, the second introduction grooves 20, the reaction grooves 24, and the merging holes 22 are covered by the exposed photoresist.

Next, the formation area of the first introduction grooves 18 on the first surface of the base 4 and the formation area of the reaction grooves 24 on the second surface of the base 4 are respectively covered by the coating material such as the masking tape, and after that, both the surfaces of the base 4 are etched at the same time. At this time, the exposed formation areas of the second introduction grooves 20 and the merging holes 22 are etched up to depth corresponding to a difference between the depth d2 and the depth d3 from the first surface of the base 4 (d2−d3), and the formation area of the merging holes 22 is etched up to the same depth from the second surface of the base 4. After that, the coating material covering the formation area of the reaction grooves 24 is removed.

After this, the formation area of the second introduction grooves 20 and the formation area of the merging holes 22 are etched by depth corresponding to a difference between the depth d3 and the depth d1 (d3−d1) from the side of the first surface of the base 4, and at the same time, the formation area of the reaction grooves 24 and the formation area of the merging holes 22 are etched by the same depth from the side of the second surface of the base 4. After this, the coating material covering the formation area of the first introduction grooves 18 is removed.

After that, the formation area of the first introduction grooves 18, the formation area of the second introduction grooves 20, and the formation area of the merging holes 22 are etched by the depth d1 from the side of the first surface of the base 4, and at the same time, the formation area of the reaction grooves 24 and the formation area of the merging holes 22 are etched by the same depth from the side of the second surface of the base 4. Thereby, the first introduction grooves 18 having the depth d1 from the first surface of the base 4 are formed. The formation area of the second introduction grooves 20 is etched up to the depth of "(d2−d3)+(d3−d1)+d1=d2" from the first surface of the base 4, and the second introduction grooves 20 having the depth d2 from the first surface of the base 4 are formed. The formation area of the reaction grooves 24 is etched up to the depth of "(d3−d1)+d1=d3" from the second surface of the base 4, and the reaction grooves 24 having the depth d3 from the second surface of the base 4 are formed. The formation area of the merging holes 22 is etched up to the same depth d2 as the second introduction grooves 20 from the side of the first surface of the base 4, and also etched up to the same depth d3 as the reaction grooves 24 from the side of the second surface of the base 4. Thereby, parts etched up to the depth d2 from the first surface of the base 4 and parts etched up to the depth d3 from the second surface of the base 4 are connected to each other, so that the merging holes 22 run through. That is, even with this configuration, the merging holes 22 are also formed by utilizing the etching for forming the second introduction grooves 20 and the etching for forming the reaction grooves 24.

A case where both the surfaces of the base 4 are etched at the same time is shown in the above embodiment. However, the first surface and the second surface of the base 4 may be etched separately from each other.

In a step for etching the base 4, at least the downstream ends 18a of the first introduction grooves 18 are only required to be formed by etching the first surface of the base 4 up to the depth d1, and at least the downstream ends 20a of the second introduction grooves 20 are only required to be formed by etching the first surface of the base 4 up to the depth d2. In this step, at least the upstream ends 24a of the reaction grooves 24 are only required to be formed by etching the second surface of the base 4 up to the depth d3. That is, the parts other than the downstream ends 18a of the first introduction grooves 18 may be formed to have depth different from the depth d1, the parts other than the downstream ends 20a of the second introduction grooves 20 may be formed to have depth different from the depth d2, and parts other than the upstream ends 24a of the reaction grooves 24 may be formed to have depth different from the depth d3. In this case, the merging holes 22 may be formed by utilizing the etching for forming the downstream ends 20a of the second introduction grooves 20 and the etching for forming the upstream ends 24a of the reaction grooves 24.

[Summary of Embodiment]

The above embodiment is summarized as below.

That is, the reactor according to the present embodiment is a reactor for reacting a first reactant and a second reactant with each other while causing the reactants to flow, including a flow path structure having an internal reactant flow passage having a first introduction passage through which the first reactant is introduced, a second introduction passage through which the second reactant is introduced, a merging passage connected to the downstream side of the first introduction passage and the downstream side of the second introduction passage, the merging passage for merging the first reactant flowing through the first introduction passage and the second reactant flowing through the second introduction passage, and a reaction passage connected to the downstream side of the merging passage with each other, the reaction passage for reacting both the reactants merged in the merging passage with each other while causing the reactants to flow, wherein the flow path structure has a base, a first sealing member joined to a first surface of the base while covering the first surface, and a second sealing member joined to a second surface of the base while covering the second surface, a first introduction groove constituting the first introduction passage and a second introduction groove constituting the second introduction passage are formed on the first surface of the base, a reaction groove constituting the reaction passage is formed on the second surface of the base, a merging hole constituting the merging passage runs from the first surface of the base to the second surface, the merging hole serves as a common end point of the first introduction groove and the second introduction groove and a starting point of the reaction groove, and a downstream end of the first introduction groove and a downstream end of the second introduction groove are merged at the merging hole from different directions from each other on the first surface of the base.

In this reactor, the first introduction groove and the second introduction groove are formed on the same surface of the base constituting the first flow path structure. The downstream end of the first introduction groove and the downstream end of the second introduction groove are merged at the merging hole from different directions from each other on the above surface, and the reaction groove is formed on the second surface of the base taking the merging hole as the starting point. Therefore, with the present configuration, the first reactant and the second reactant can be mixed with high uniformity in comparison to a conventional configuration in which a first introduction groove and a reaction groove are formed on a first surface of a base so that bottom surfaces are flush with each other, and a second introduction groove formed on a second surface of the base is merged with the above grooves through a merging hole. That is, in the this reactor, since the downstream ends of the first introduction groove and the second introduction groove formed on the first surface of the base are merged at the merging hole from different directions from each other, and the reaction groove extends on the second surface of the base taking the merging hole as the starting point, the first reactant and the second reactant run through to the side of the second surface of the base and flow into the reaction passage while being merged so as to be crashed into each other. Thus, both the reactants are mixed with each other under substantially equal conditions. Therefore, in this reactor, in comparison to a conventional mixing mode in which a second reactant is mixed from the second reactant groove formed on the second surface of the base into a first reactant linearly and smoothly flowing in the first introduction groove and the reaction groove formed on the first surface of the base so that the bottom surfaces are flush with each other, both the reactants are easily mixed with each other. As a result, the uniformity of mixing of both the reactants can be increased.

In the above reactor, the downstream end of the first introduction groove and the downstream end of the second introduction groove are preferably positioned on an identical straight line, and merged at the merging hole from the opposite sides to each other.

With such a configuration, since the first reactant and the second reactant can flow into the merging passage from the opposite sides to each other, both the reactants are crashed into and mixed with each other in the merging passage. Thereby, both the reactants are more easily mixed with each other. As a result, the uniformity of the mixing of both the reactants can be more increased.

In the above reactor, preferably, the plurality of reactant flow passages is provided inside the flow path structure, the plurality of first introduction grooves constituting the first introduction passages of the reactant flow passages is formed in parallel and in a row on the first surface of the base, the plurality of second introduction grooves constituting the second introduction passages of the reactant flow passages is formed in parallel and in a row on the side of the first surface of the base, and the plurality of reaction grooves constituting the reaction passages of the reactant flow passages is formed in parallel and in a row on the side of the second surface of the base.

In order to merge the first reactant and the second reactant so as to be crash into each other to cause the reactants to flow into the reaction passages, for example, the first introduction grooves and the second introduction grooves may be merged on the first surface of the base so as to cross at an angle of less than 180°. However, in that case, a necessary area is increased. Due to this, even in a case where a large number of the reactant flow passages are to be integrated in order to improve productivity of a product in the reactor, a great integration result can be hardly obtained. Meanwhile, with the above configuration, the first introduction passages of a large number of the reactant flow passages are provided in parallel and in a row and the second introduction passages of a large number of the reactant flow passages are provided in parallel and in a row on the side of the first surface of the base, and further, the reaction passages of a large number of the reactant flow passages are provided in parallel and in a row on the side of the second surface of the base. Thus, the first introduction passages can be more integrally arranged and the second introduction passages can be more integrally arranged on the side of the first surface of the base, and further, the reaction passages can be more integrally arranged on the side of the second surface of the base. As a result, the reactant flow passages can be favorably integrated in the reactor. Therefore, with this configuration, while increasing the uniformity of the mixing of the reactants, the favorable integration effect of the reactant flow passages can be obtained.

In this case, each of the reactant flow passages may have a third introduction passage through which a third reactant is introduced, a plurality of third introduction grooves constituting the third introduction passages of the reactant flow passages may be formed in parallel and in a row on the second surface of the base, and downstream ends of the third introduction grooves may be connected to the corresponding merging holes.

With this configuration, the third reactant is further mixed in addition to the first reactant and the second reactant, so that the reaction product can be produced. In a case where the first introduction grooves are formed in parallel and in a row and the second introduction grooves are formed in parallel and in a row on the first surface of the base, it is difficult to merge the third introduction grooves from the same direction at the merging holes at which the introduction grooves are merged while avoiding interference with the introduction grooves on the first surface of this base. However, with this configuration, the third introduction grooves are formed on the second surface of the base. Thus, the third introduction grooves can be arranged in parallel and in a row, and easily merged at the merging holes from the same direction. Due to this, the third reactant can be merged with the first reactant and the second reactant from the same direction in the reactant flow passages. As a result, a merging mode of the third reactant with the first reactant and the second reactant in the reactant flow passages can be uniformized.

The manufacturing method of the reactor according to the above embodiment is a method for manufacturing the reactor including a first introduction groove formation step for etching the first surface of the base up to first depth and forming at least the downstream end of the first introduction groove, a second introduction groove formation step for etching the first surface of the base up to second depth larger than the first depth and forming at least the downstream end of the second introduction groove, a reaction groove formation step for etching the second surface of the base up to third depth larger than a difference between thickness of the base and the second depth and smaller than a difference between the thickness of the base and the first depth and forming at least an upstream end of the reaction groove, a first merging hole formation step for etching a formation area of the merging hole on the first surface of the base up to the second depth at the same time as the second introduction groove formation step, and a second merging hole formation step for etching the formation area of the merging hole on the second surface of the base up to the third depth at the same time as the reaction groove formation step, wherein a part etched up to the second depth in the first merging hole formation step and a part etched up to the third depth in the second merging hole formation step are connected to each other, so that the merging hole runs through.

In this manufacturing method of the reactor, by etching the formation area of the merging hole on the first surface of the base up to the second depth at the same time as a second introduction groove connection portion formation step, and also etching the formation area of the merging hole on the second surface of the base up to the third depth at the same time as a reaction groove connection portion formation step, the part etched up to the second depth from the first surface of the base and the part etched up to the third depth from the second surface of the base are connected to each other, so that the merging hole runs through. Therefore, the merging holes can be formed by utilizing the etching for the second introduction groove connection portion formation step and the etching for the reaction groove connection portion formation step. Accordingly, in this manufacturing method of the reactor, an exclusive etching step for forming the merging hole, a step for forming the merging hole by laser processing or the like, and the like are not necessarily separately performed. Thus, a manufacturing step of the reactor can be simplified.

As described above, according to the above embodiment, the uniformity of the mixing of the reactants in the reactor can be increased.

The invention claimed is:

1. A reactor for reacting a first reactant and a second reactant with each other while causing the reactants to flow, comprising:
    a flow path structure having an internal reactant flow passage having:
    a first introduction passage connected to a source of a first reactant and through which the first reactant is introduced;
    a second introduction passage connected to a source of a second reactant and through which the second reactant is introduced;
    a merging passage connected to the downstream side of said first introduction passage and the downstream side of said second introduction passage, said merging passage for merging the first reactant flowing through said first introduction passage and the second reactant flowing through said second introduction passage; and
    a reaction passage connected to the downstream side of said merging passage, said reaction passage for reacting both the reactants merged in said merging passage with each other while causing the reactants to flow, wherein
    said flow path structure has a base, a first sealing member joined to a first surface of said base while covering said first surface, and a second sealing member joined to a second surface of said base while covering said second surface,
    a first introduction groove constituting said first introduction passage and a second introduction groove constituting said second introduction passage are formed on said first surface of said base,
    a reaction groove constituting said reaction passage is formed on said second surface of said base,
    a merging hole constituting said merging passage runs from said first surface of said base to said second surface,
    said merging hole serves as a common end point of said first introduction groove and said second introduction groove and a starting point of said reaction groove, and
    a downstream end of said first introduction groove and a downstream end of said second introduction groove are merged at said merging hole from different directions from each other on said first surface of said base,
    wherein the downstream end of said first introduction groove and the downstream end of said second introduction groove are positioned on an identical straight line, and merged at said merging hole from the opposite sides to each other,
    wherein a depth of said second introduction groove constituting said second introduction passage, in a direction normal to said straight line, is greater than a depth of said first introduction groove constituting said first introduction passage,
    wherein said reaction passage extends parallel to said first and second introduction passages, and in a direction whereby a flow direction of the first reactant is reversed.

2. The reactor according to claim 1, wherein
    a plurality of said reactant flow passages is provided inside said flow path structure,
    a plurality of said first introduction grooves constituting said first introduction passages of said reactant flow passages is formed in parallel and in a row on said first surface of said base,
    a plurality of said second introduction grooves constituting said second introduction passages of said reactant flow passages is formed in parallel and in a row on the side of said first surface of said base, and
    a plurality of said reaction grooves constituting said reaction passages of said reactant flow passages is formed in parallel and in a row on the side of said second surface of said base.

3. A reactor for reacting a first reactant and a second reactant with each other while causing the reactants to flow, comprising:
    a flow path structure having an internal reactant flow passage having:
    a first introduction passage connected to a source of a first reactant and through which the first reactant is introduced;
    a second introduction passage connected to a source of a second reactant and through which the second reactant is introduced;
    a merging passage connected to the downstream side of said first introduction passage and the downstream side of said second introduction passage, said merging passage for merging the first reactant flowing through said first introduction passage and the second reactant flowing through said second introduction passage; and
    a reaction passage connected to the downstream side of said merging passage, said reaction passage for reacting both the reactants merged in said merging passage with each other while causing the reactants to flow, wherein
    said flow path structure has a base, a first sealing member joined to a first surface of said base while covering said first surface, and a second sealing member joined to a second surface of said base while covering said second surface, a first introduction groove constituting said first introduction passage and a second introduction groove constituting said second introduction passage are formed on said first surface of said base, a reaction groove constituting said reaction passage is formed on said second surface of said base, a merging hole constituting said merging passage runs from said first surface of said base to said second surface, said merging hole serves as a common end point of said first introduction groove and said second introduction groove and a starting point of said reaction groove, and a downstream end of said first introduction groove and a downstream end of said second introduction groove are merged at said merging hole from different directions from each other on said first surface of said base, wherein a plurality of said reactant flow passages is provided inside said flow path structure, a plurality of said first introduction grooves constituting said first introduction passages of said reactant flow passages is formed in parallel and in a row on said first surface of said base, a plurality of said second introduction grooves constituting said second introduction passages of said reactant flow passages is formed in parallel and in a row on the side of said first surface of said base, and a plurality of said reaction grooves constituting said reaction passages of said reactant flow passages is formed in parallel and in a row on the side of said second surface of said base, wherein each of said reactant flow passages has a third introduction passage through which a third reactant is introduced, a plurality of third introduction grooves constituting said third introduction passages of said reactant flow passages is formed in parallel and in a row on said second surface of said base, and downstream ends of said third introduction grooves are connected to said corresponding merging holes.

4. A method for manufacturing the reactor according to claim 1, comprising:

a first introduction groove formation step for etching the first surface of the base up to first depth and forming at least the downstream end of the first introduction groove;

a second introduction groove formation step for etching the first surface of the base up to second depth larger than the first depth and forming at least the downstream end of the second introduction groove;

a reaction groove formation step for etching the second surface of the base up to third depth larger than a difference between thickness of the base and the second depth and smaller than a difference between the thickness of the base and the first depth and forming at least an upstream end of the reaction groove;

a first merging hole formation step for etching a formation area of the merging hole on the first surface of the base up to the second depth at the same time as the second introduction groove formation step; and a second merging hole formation step for etching the formation area of the merging hole on the second surface of the base up to the third depth at the same time as the reaction groove formation step, wherein a part etched up to the second depth in the first merging hole formation step and a part etched up to the third depth in the second merging hole formation step are connected to each other, so that the merging hole runs through.

\* \* \* \* \*